United States Patent [19]
Meier

[11] 4,301,753
[45] Nov. 24, 1981

[54] SEWING MACHINE WITH TAPE RECORDER FOR USER INSTRUCTION AND MEMORY PROGRAMMING

[75] Inventor: Günter Meier, Karlsruhe-Durlach, Fed. Rep. of Germany

[73] Assignee: Firma Dorina Nähmaschinen GmbH, Fed. Rep. of Germany

[21] Appl. No.: 136,984

[22] Filed: Apr. 3, 1980

[30] Foreign Application Priority Data

Apr. 19, 1979 [CH] Switzerland .......................... 3676/79

[51] Int. Cl.³ ...................... D05B 19/00; D05B 87/04; D05B 3/02
[52] U.S. Cl. ........................... 112/121.11; 112/158 E; 112/302; 434/95; 434/224; 360/12
[58] Field of Search ...................... 112/121.11, 121.12, 112/158 E, 158 F, 278, 302; 35/8 A, 15; 360/12

[56] References Cited

U.S. PATENT DOCUMENTS

| | | | |
|---|---|---|---|
| 1,205,108 | 11/1916 | Randall | 112/278 X |
| 3,654,619 | 4/1972 | Tishman | 35/8 A X |
| 3,668,648 | 6/1972 | Yoshikawa | 360/12 X |
| 3,804,993 | 4/1974 | Honnold et al. | 360/12 X |
| 3,810,414 | 5/1974 | Gerber | 112/121.12 |
| 3,871,310 | 3/1975 | Hanyu | 112/158 F |
| 3,986,466 | 10/1976 | Herzer et al. | 112/121.12 |
| 4,021,036 | 5/1977 | Nelson et al. | 35/8 A X |

FOREIGN PATENT DOCUMENTS

2137686 2/1973 Fed. Rep. of Germany ....... 35/8 A

Primary Examiner—Peter P. Nerbun
Attorney, Agent, or Firm—McGlew and Tuttle

[57] ABSTRACT

A sewing machine includes a housing with an upper arm portion, a standard and a cloth holder arm and a sound player such as a transcriber recorder associated with the sewing machine with a sound producing device for explaining the operation thereof. The device may be associated with the machine itself, for example by being incorporated in the upper arm or it may be included as a portion of a cabinet for the sewing machine.

3 Claims, 4 Drawing Figures

SEWING MACHINE WITH TAPE RECORDER FOR USER INSTRUCTION AND MEMORY PROGRAMMING

FIELD AND BACKGROUND OF THE INVENTION

This invention relates in general to sewing machines and in particular to a new and useful sewing machine having a sound transcriber recorder associated therewith.

Sewing machines known until now are generally supplied with operating instructions in written form with explanatory examples. Such operating instructions are absolutely necessary especially when the sewing machine is equipped with several special functions, the execution of which must be explained. Not infrequently, however, it happens that these operating instructions cannot be found when needed, because they have been misplaced or lost. To avoid these drawbacks the attempt has been made to mark the most important sewing functions symbolically on the machine housing, in or on, the cover. Such a measure has the disadvantage, however, that due to the very small available area the possibilities of information are very limited. Therefore, only the bare minimum of operating information can be made available.

SUMMARY OF THE INVENTION

To avoid these disadvantages, the invention provides means to improve the information and increase the amount of information on the operation of the sewing machine, solving this problem by installing in the sewing machine a tape recorder known in itself.

Thus information can be given not only about the normal operation of the sewing machine, but detailed sewing instructions or complete sewing courses about making various garments can be made available to the seamstress.

If the mechanical equipment for the drive of the sewing tools is lodged in the pedestal or standard of the sewing machine, the upper arm is available for the accommodation of the sewing accessories and advantageously also for the installation of the tape recorder and of the loudspeaker as well as the respective control elements.

If it is difficult to accommodate the tape recorder in the machine itself, it may alternatively be installed in the cabinet of the sewing machine.

In a sewing machine with a pattern control device provided with a control circuit comprising a programmable electronic memory, the tape recorder comprises according to an advantageous form of realization of the invention a rerecording connection which is connectable with a receiving connection of the electronic memory.

In a sewing machine whose housing is equipped with luminous diodes and which comprises a tape recorder containing a pulse switch known in itself controllable by means of a pulse track extending parallel to the sound track of the tape, the indicating diodes can be connected via control lines to the pulse switch of the tape recorder for switching on and off.

Accordingly, it is an object of the invention to provide a sewing machine which includes a sewing machine housing and a sound player associated with the sewing machine housing having a device for producing a sound providing instructions for the operation of the machine.

A further object of the invention is to provide a sewing machine or a cabinet or other accessory associated therewith which includes a sound producing device for supplying instructions for operation which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
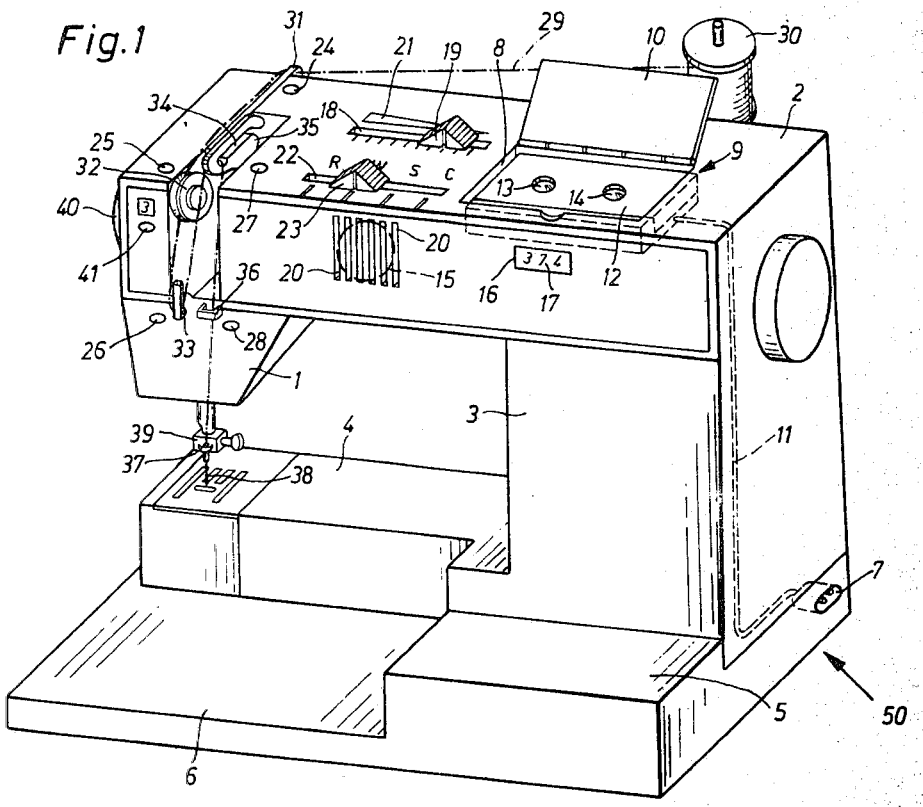
FIG. 1 is a front top perspective view of a sewing machine constructed in accordance with the invention.

Referring to the drawings in particular the invention embodied therein comprises a sewing machine or accessory generally designated 50 which includes a sound producing device generally designated 9 which is associated therewith and which provides means for producing a sound track for use in the operation of the sewing machine.

A sewing machine generally designated 50 as shown in FIG. 1 comprises a head 1, upper arm 2, standard 3, lower arm 4 and pedestal 5 with a base plate 6. In the standard 3 is installed a drive motor (not shown) for the sewing machine, supplied with current through a plug 7.

In a recess 8 in upper arm 2 is installed a sound player such as a tape recorder-transcriber 9 known in itself. The sound player may comprise a sound, tape, wire or similar device and is advantageously a so-called cassette player, which is closed off at the top by a cable 11 possibly via a transformer to the plug 7. The tape recorder 9 has the usual cassette or 8-track 12, in which are installed two reels carrying the recording tape. The reels are controlled in a manner known in itself by two drive pins 13 and 14 via a drive (not shown) located below the cassette 12. In playback operation, the information stored on the tape is picked up in known manner by a sound head (not shown) and conveyed via an amplifier (not shown) to a loudspeaker 15.

Through a display window 16 provided in the front of the upper arm 2, a counter 17 suitably connected with the drive of the tape recorder 9 can be read. On the upper arm 2 a slit 18 is provided, from which a knob 19 protrudes. This knob 19 is connected with a slide for adjusting the volume of loudspeaker 15 mounted behind sound passage openings 20 in the front of the upper arm 2, the slide being secured below slit 18 in the upper arm 2. A mark 21 next to slit 18 in the form of an elongated triangle indicates the volume at the respective position of knob 19.

A second knob 23 protruding from slit 22 in the upper arm 2 is connected with a sliding switch installed in the upper arm 2 to control the various functions of the tape recorder 9, such as "Return," "Playback," "Stop", and "Open cassette Compartment". The various possible positions of knob 23 are identified by appropriate marks, R,W,S and C on one side of slit 22. Opening of the cassette compartment is effected by shifting knob 23 to mark C. This releases a lock (not shown) of the cover 10, which can then be flapped open. Changing the cassettes 12 is done in known manner.

After closing cover 10 in position S of knob 23, the tape is driven in a forward direction in position W of knob 23, the information stored on the tape being played back through the loudspeaker 15.

Setting to a desired information can be effected by means of the counter 17.

On head 1 an on upper arm 2 of the sewing machine, luminous diodes 24 to 28 are provided, which are connected in a manner not shown, known in itself, via control lines to a pulse switch known in itself of the tape recorder 9, which switch can switch the diodes 24 to 28 on and off independently of each other. The diodes 24 to 28 mark the course of an upper thread 29. The thread 29 runs from a bobbin 30 mounted on the upper arm to a deflection point 31, which is defined by diode 24, a deflection point 33 by diode 26, and through a threading slit 34 in a thread lever 35. Next to the upper end position of thread lever 35, which is expediently always threaded in its upper position shown in FIG. 1, diode 27 is provided. The upper thread 29 runs further over an eyelet 36 on head 1 which is marked by diode 28, to an eyelet 37 in a needle-holder 39 carrying a needle 38, and then to the eye of needle 38.

Each operative location for the thread along its path thus has a diode associated therewith.

When listening to the acoustical information about the threading path of the upper thread 29, a pulse track on the tape disposed parallel to the sound track sends a pulse to the pulse switch (not shown). The pulse switch switches the diodes 24 to 28 on, which then light up and mark the sequence of the threading operation. After a certain period of time, the pulse switch switches the diodes 24 to 28 off again.

Other indicating means can be controlled by pulses on the tape. For example, a certain angular position of a setting disc 40 connected with the thread tension can be marked by a luminous diode 41 which is connected with the pulse switch via a micro switch (not shown). The micro switch is closed by a cam of the setting disc 40 when the predetermined angular position is reached. With the acoustical information about the sewing of an overcast seam or a blind stitch seam, the pulse track on the tape delivers to the pulse switch a pulse which energizes the lead to the micro switch at the diode 41. As soon as the operator, instructed by the information of the tape, turns the setting disc to the predetermined position, the micro switch is switched on by the cam of the setting disc 40 and diode 41 lights up.

The tape may contain the complete operating instructions for adjustment of the sewing machine and its use, especially instructions on the threading path of the upper and lower threads, setting of the thread tensions, selection and a discussion of the stitch plates for the various sewing tasks, the sequence of the manipulations to be carried out, matching of cloth, yarn and needle, as well as all other necessary or useful information for the use of the sewing machine. At the same time sewing instructions for the expedient making of certain garments can be played back through the tape recorder 9 in the form of an instruction course.

If the tape recorder 9 is installed in a sewing machine which is equipped with a pattern control device provided with a control circuit comprising a programmable electronic memory, it can be used to introduce a pattern data into the memory. It is simply necessary that the tape in cassette 12 comprises the respective information and that there is a possibility of reading this information into the memory.

Figure 2:
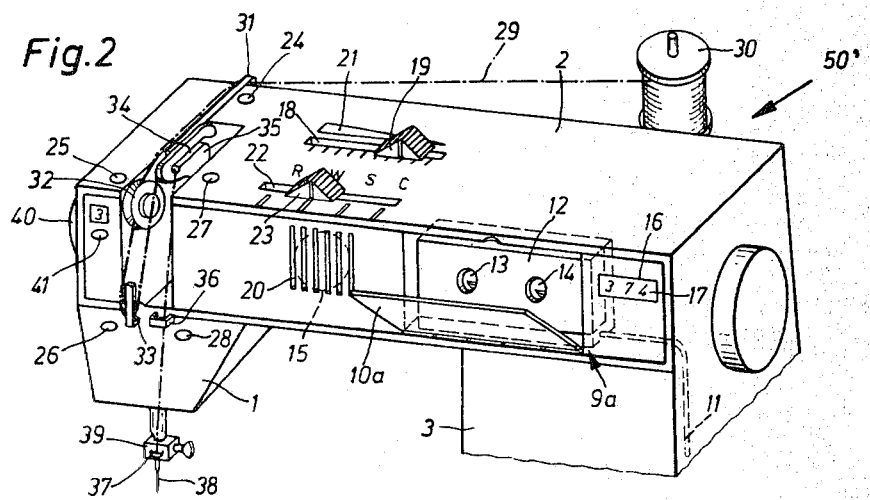
FIG. 2 is a view similar to FIG. 1 of another embodiment of the invention.

FIG. 2 shows a sewing machine 50' corresponding to FIG. 1 with similar parts similarly designated where a tape 9a accessible from the front is installed in the upper arm 2 of a sewing machine 50'. The tape recorder 9a is equipped with a cover 10a which can be flapped open toward the front to change the cassette 12. The remaining design and the arrangement of the control elements of the tape recorder 9a is is equivalent to the example according to FIG. 1.

Figure 3:
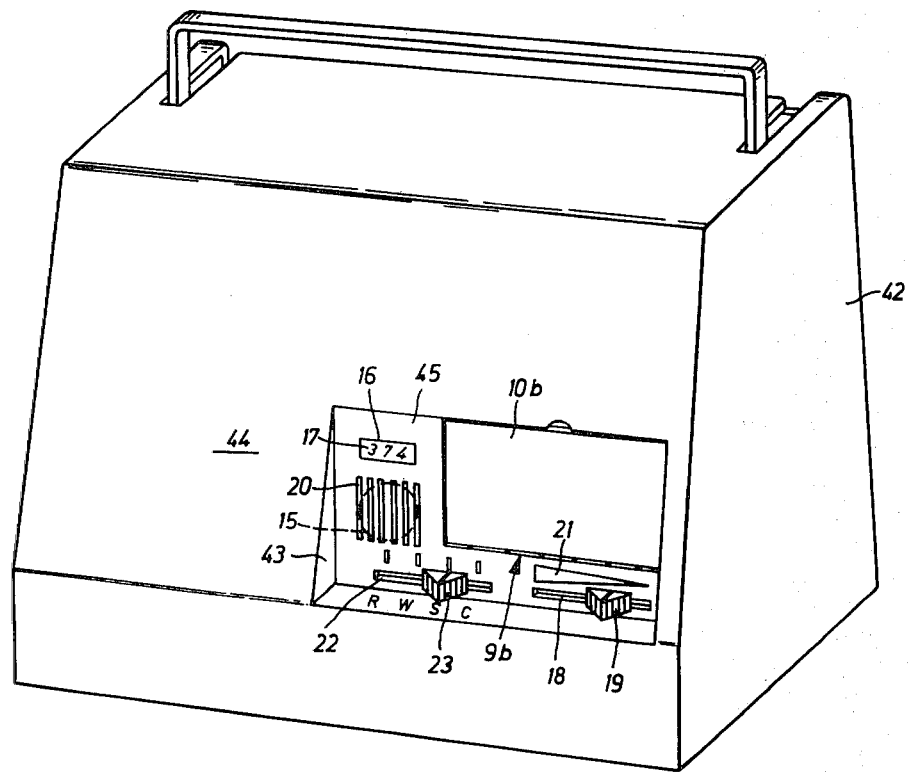
FIG. 3 is a front top perspective view of a cabinet for a sewing machine having a sound producing device therein constructed in accordance with the invention.

In FIG. 3, a sewing machine cabinet 42 is shown, where a tape recorder 9b is installed in a niche 43 of a cabinet wall 44, Advantageously, this tape recorder 9b can be supplied with current from batteries, to make it independent of the main power supply; however, an AC drive is possible also.

The tape recorder 9b and associated control elements as well as the rest of the arrangement, which are equivalent to those according to the example in FIG. 1, are received in a panel 45 secured in the niche 43.

Figure 4:
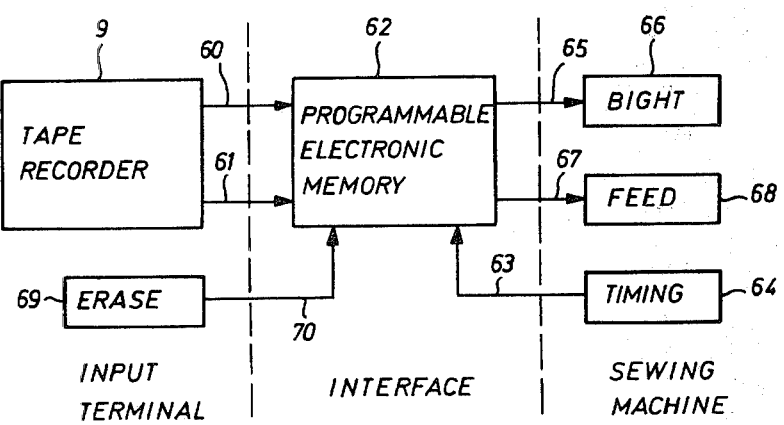
FIG. 4 is a block diagram showing the flow of information from the tape recorder to the sewing machine.

The digital pattern information on the tape of tape recorder 9 is sequentially entered, through a line 60 shown in FIG. 4, as a zig-zag information or, through a line 61, as a feed information, into an electronic pattern storage 62 of known design, and stored therein. Upon transferring all of the information on a pattern sequence from the tape into pattern storage 62, sewing machine 30 can be set in operation to sew the corresponding pattern. To this end, the pattern sequence stored in pattern storage 62 is successively addressed through a line 63 by a timing element 64 connected to pattern storage 62, and successively delivered through a line 65 to a bight control 66 controlling the reciprocating mechanism of sewing machine 50, or through a line 67, to a feed control 68 controlling the feed mechanism of sewing machine 50. This causes the sewing machine to produce a sewing pattern corresponding to the pattern sequence stored on the tape.

The stored sequence of information may be erased through an erase mechanism 69 which is connected through a line 70 to pattern storage 62.

While specific embodiments of the invention have been shown and described in detail to illustrate the application of the principles of the invention, it will be understood that the invention may be embodied otherwise without departing from such principles.

What is claimed is:

1. A sewing machine comprising:
   a housing;
   thread path defining means connected to said housing for establishing a path for a sewing thread having a plurality of operative locations;
   a light emitting diode in said housing associated with each of said operative positions of said path;
   a sound tape playing device in said housing having a tape which carries information about each operative location and a recorded pulse track for each operative location adjacent the information;

a loudspeaker in said housing for playing the information, the playing device also playing the pulse track for each operative location; and a pulse responsive switch connected to each light emitting diode responsive to each played pulse track to light that light-emitting diode corresponding to the played pulse track.

2. A sewing machine according to claim 1, including at least one setting member movable to a setting position to set a function of the sewing machine, indication means connected to said setting member activated when said setting member reaches said setting position, at least one additional diode connected to said indicating means which is turned on when said indicating means is activated, and an additional pulse track on said tape for turning said additional diode on when said additional pulse track is played by said sound tape playing device to indicate, by the lighting of said additional diode, the positioning of said setting member at said setting position.

3. A sewing machine including a housing and a sound player associated with said housing having means for producing a sound for facilitating the operation thereof, said sewing machine housing includes a base portion, a standard upright portion and an upper arm carried by said standard, said sound producing device being installed in said upper arm and including a loudspeaker mounted in said housing and a tape recorder connected to said loudspeaker located within said upper arm, said housing having an opening aligned with the loudspeaker and a pattern control device in said housing and a control circuit having a programmable electronic memory in said housing connected to said pattern control device, said tape recorder adapted to receive a tape containing pattern data stored thereon readable by said control circuit to program said electronic memory for said pattern data.

* * * * *